United States Patent [19]

Nauck

[11] 4,304,054
[45] Dec. 8, 1981

[54] SCREW PRESS FOR DRYING ELASTOMERIC POLYMERS

[75] Inventor: George S. Nauck, Vidor, Tex.

[73] Assignee: The B. F. Goodrich Company, Akron, Ohio

[21] Appl. No.: 142,421

[22] Filed: Apr. 21, 1980

[51] Int. Cl.³ ............................................. F26B 17/20
[52] U.S. Cl. ..................................... 34/183; 100/117;
100/145; 241/82.1; 241/82.5; 366/87; 366/90;
366/322
[58] Field of Search ................................. 100/145, 117;
241/82.1-82.7, 260.1, 167; 99/452, 453;
425/198, 207, 208; 34/183; 366/87, 90, 322

[56] References Cited
U.S. PATENT DOCUMENTS

| 3,304,578 | 2/1967 | Clute | 241/82.1 |
|---|---|---|---|
| 3,461,934 | 8/1969 | Waters | 241/82.1 |
| 3,480,997 | 12/1969 | List | 425/198 |
| 3,524,222 | 8/1970 | Gregory et al. | 425/208 |
| 3,652,064 | 3/1972 | Lehnen et al. | 425/208 |
| 3,734,148 | 5/1973 | McCully | 241/82.1 |
| 3,814,563 | 6/1974 | Slaby et al. | 425/208 |
| 3,941,535 | 3/1976 | Street | 425/208 |

Primary Examiner—Larry I. Schwartz
Attorney, Agent, or Firm—Joseph Januszkiewicz

[57] ABSTRACT

A screw press for drying elastomeric polymers and the like having a cylindrical barrel and intermixed, substantially solid and apertured, discontinuous screw flights for more quickly initiating pressure and temperature increase of polymer in the barrel without increasing the back-up restriction and final pressure at the discharge end of the barrel.

3 Claims, 8 Drawing Figures

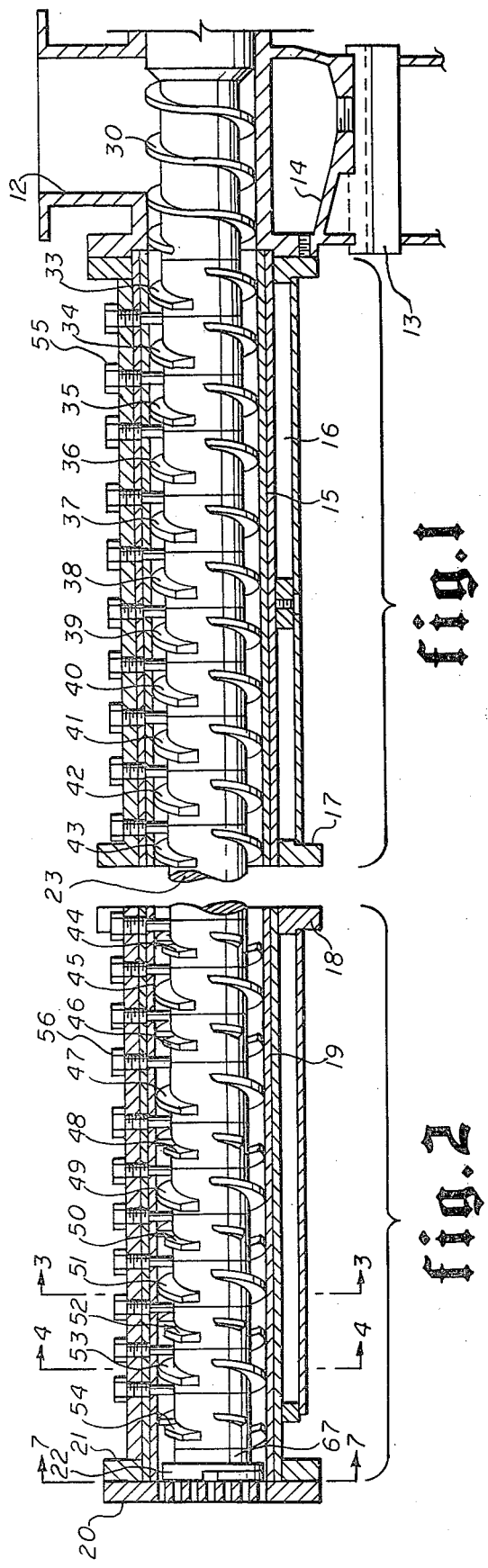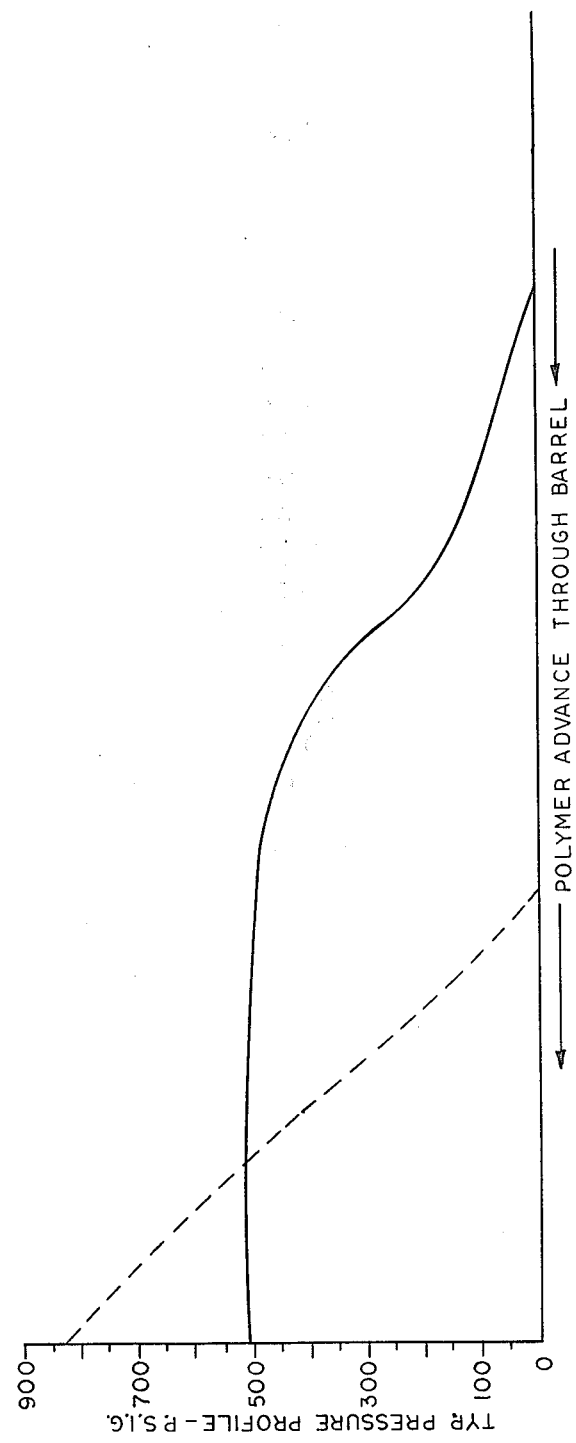

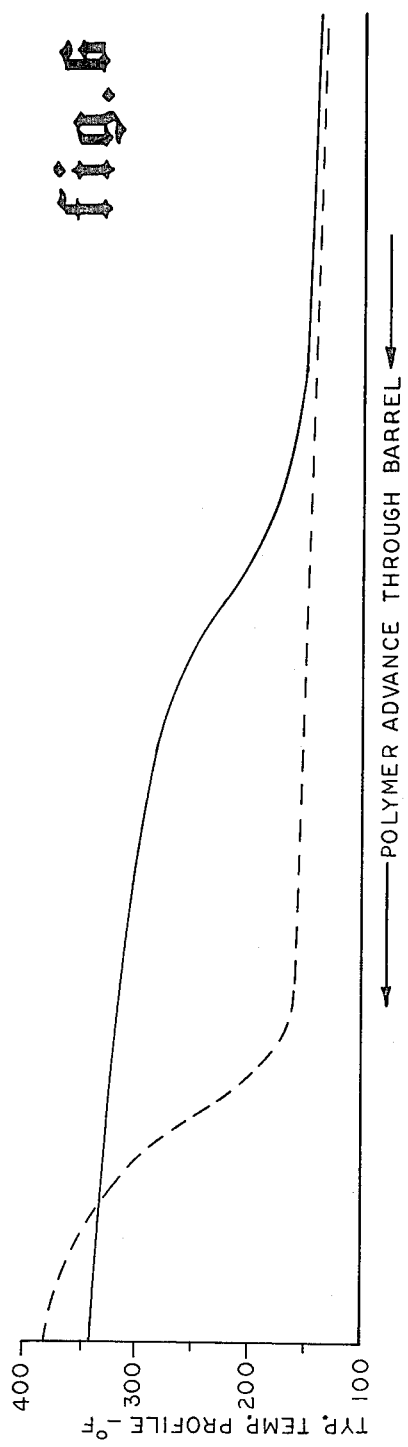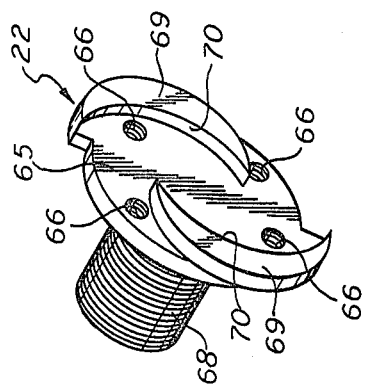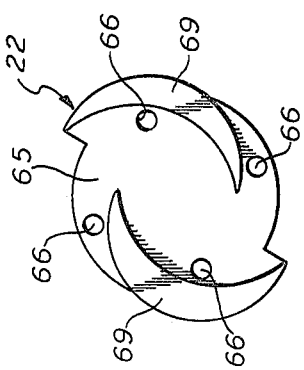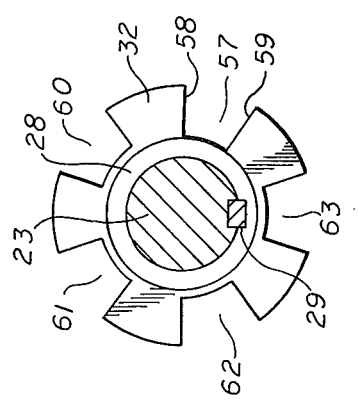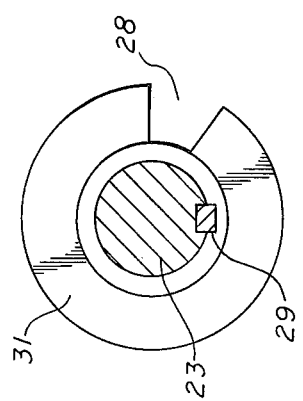

SCREW PRESS FOR DRYING ELASTOMERIC POLYMERS

FIELD OF THE INVENTION

This invention relates to screw presses, particularly of the intermittent flight type for expanding and drying elastomeric polymers and the like.

BACKGROUND OF THE INVENTION

In the synthetic rubber industry, extensive use has been made of screw presses with intermittent thread flights in both the dewatering and final drying stages of manufacture. Zies U.S. Pat. No. 3,222,797 discloses such a drying press or "expander" in which the dewatered polymer fed to the press barrel inlet is initially propelled forwardly by a continuous flight unit of several turns or wraps, then advanced through a series of separate flights, and, finally, is ejected through a perforated die plate exit restriction. Rows of "breaker" bolts project radially into the cylindrical barrel between the individual thread flights to increase the resistance to rotation of the feed stock plugs as they are advanced through the casing by rotation of the feed worm. The die head restriction is variable so that the polymer will be compacted throughout a substantial portion of the barrel by the action of the pitched flights. Once the polymer is compacted and "worked," i.e., agitated and kneaded by screw action, heat is developed by friction and hysteresis effects and under the influence of external heating means. The temperature and pressure of the polymer and contained water rise during the process. As the polymer exits through the discharge dies, the pressure is abruptly reduced to atmospheric and the superheated water is released as steam as the polymer expands. This is how drying is accomplished.

Since there are a variety of polymer types with different properties, variable temperature and pressure requirements necessary for drying are usually achieved by proper selection of the size, shape, and number of discharge die openings.

When maximum throughput rates are desired, the die considerations must be adjusted to cause sufficient restriction and back pressure to produce compacting of the rubber through most of the length of the barrel, so that the polymer will receive maximum work input and heating. This often results in extreme pressures at the die head, e.g., as much as 1500 p.s.i.g., and extreme velocities of polymer through the dies. This can produce intolerable conditions at the expander exit because the violent explosions and high velocities produce a very fine product which sticks to the equipment and conveyors, is drawn into the ventilation system, and conveys poorly.

Another disadvantage in the described arrangement is in the tendency of the highly pressured and heated polymer to produce non-uniform crumb with stranded, dense product from some holes and fragmented, blowing fines from other holes.

In the above described prior art drying practice, all thread flights of the feed worm have a drive shaft wrap of approximately 95%. However, Zies U.S. Pat. No. 3,034,424 discloses a feed screw press for removing oil or the like from organic materials, while preventing damaging pressuring and heating of the liquid. Separate flights of the feed screw are variously shortened and relatively positioned to produce tortuous relief passages for returning excessively pressured product to the barrel inlet, to prevent excessive pressure and temperature build-up in the barrel.

SUMMARY OF THE PRESENT INVENTION

An object of this invention is to provide an intermittent flighted feed screw dryer of the general type utilized in the above described prior art dryer or expander practice with means for increasing the pressuring and heating of the polymer throughout a greater portion of the length of the feed barrel with lower exit pressures than have been heretofore attained.

Another object is to increase the capacity of the dryer.

Another object is to provide more uniform and more easily handled dried discharge crumb than heretofore.

In accordance with the present invention, selected ones of the individual thread flights are provided with peripheral slots or openings which have the effect of decreasing the polymer advancing action produced by the particular flight, which means that pressure must be developed by a precedding flight or series of flights, sufficient to advance the polymer through the slotted flight. Placement of these slotted flights with reduced advancing action at intervals on the shaft requires that sufficient pressure must exist at every point upstream of each slotted flight to convey the polymer mass through the slotted flight. The result is that pressure and compacting of the polymer mass develops at an earlier stage in the machine. Since work input and heating through friction and hysteresis is very low until pressure and compacting is achieved, this invention allows the work input to begin earlier after the polymer enters the machine. This allows high work input required for high product throughput with reduced internal pressure requirement at the discharge end of the machine. This allows the selection of the size and number of discharge die openings to be based on pressure required to maintain water in the liquid state, rather than to be based on discharge end pressure that would cause polymer pressure development and compacting at an early stage in the machine. This ability to have sufficient pressure developed throughout most of the machine to accommodate work input without excessive discharge end pressure facilitates an increase in the capacity of the press and allows the size and/or number of discharge end die openings to be increased for better crumb formation to reduce the problem of fine particle formation, polymer sticking problems, and poor conveying characteristics.

BRIEF DESCRIPTION OF THE FIGURES

In the accompanying drawings:

FIG. 1 is a vertical, longitudinal section of the first stage of the worm or screw drying press.

FIG. 2 is a similar view of the left hand, second stage half of the press.

FIG. 3 is a vertical transverse cross section taken on line 3—3 of FIG. 2 and illustrating one of the more or less standard flights.

FIG. 4 is a cross section taken on line 4—4 of FIG. 2 and illustrating one of the flights modified in accordance with this invention.

FIG. 5 is a graph illustrating in dashed line the range of pressure variation along a prior art drying press with all flights developed in accordance with FIG. 3 and, in solid line, with certain flights modified as in FIG. 4.

FIG. 6 is a graphical representation of temperature variations along the press, in dashed line, with all flights according to FIG. 3, and in solid line, with certain flights modified according to FIG. 4.

FIG. 7 is a section taken on line 7—7 of FIG. 2 showing the die plate distributor.

FIG. 8 is an isometric view of the distributor.

DETAILED DESCRIPTION OF THE FIGURES

At the right hand end of the portion of the press shown in FIG. 1 is the feed hopper 12 through which the dewatered polymer, typically containing 5% to 15% surface and internally occluded moisture, is supplied to the extreme right hand portion 13 of the press barrel or casing. Portion 13 forms a water discharge trough 14. Barrel 15 is double walled, forming a heating jacket 16. A flange 17 at the left end of first stage barrel 15 serves for attachment to a flange 18 at the abutting end of the second stage barrel 19 constructed generally similar to first stage barrel 15. At its left end, barrel 19 is provided with an exit-restricting die plate or head 20 secured to barrel flange 21. A discharge distributor 22, to be described hereafter, is interposed in the space between the die plate or head and is attached to the adjacent end of the drive shaft generally designated 23.

The drive shaft 23 extends axially through both sections of the barrel from power drive mechanism (not shown) at its right hand end. As shown in FIGS. 3 and 4, the drive shaft is enveloped by a series of end-to-end collars, as 28, keyed to the shaft, as at 29. These collars rigidly carry individually separated thread sections or flights 30 (FIG. 1), 31 (FIG. 3), and 32 (FIG. 4) to be described. The first flight 30 within hopper 12 at the entry end of the drive shaft is continuous for several turns or wraps for initially delivering the polymer charge to the barrel. The remainder of the thread flights, numbered 33–54, are discontinuous. Projecting radially into the barrel, between the flights, are several rows of "breaker" bolts, as at 55, 56.

The flights 30 and 33–43 in the first stage barrel 15, and alternate flights designated 45, 47, 49, 51, and 53 in the second stage barrel portion 19, are each of the solid, conventional type of FIG. 3 and of approximately 95% wrap of the drive shaft, in accordance with previous standard practice. They are discontinuous and each extending substantially solidly outwardly from the shaft to its outer edge and closely approaching and conforming to the shape of the barrel wall, as shown. On the other hand, in the exemplary embodiment disclosed, the intervening flights in the second stage, i.e., designated 44, 46, 48, 50, 52, and 54 are peripherally slotted and made according to said modified form in FIG. 4.

The modified flights are slotted, as stated. One slot 57 in both type of flights is actually formed between the forward and trailing edges 58 and 59 of the flight for clearing bolts 55, while four additional slots or apertures 60–63 are equally spaced along the crest of the flight. Thus, the second stage portion of the feed worm is provided with alternate, nearly complete standard flights, as in FIG. 3, and peripherally slotted or apertured flights, as in FIG. 4. The effect of the notching of some flights is to give these flights greater rotational grip on the polymer plug immediately ahead (downstream), while reducing the polymer advancing action of the flight. This, in turn, tends to rotate and increase the compaction in the affected polymer plug, while relying on the advancing action of the upstream, standard or solid screw flights. The cumulative effect of the slotted and standard flights distributed along the barrel is to cause the rubber to come under pressure sooner after it enters the machine and to begin the heating process at essentially the same point regardless of throughput rate and die head back pressure. The pressure and temperature required with the modifications are generally lower than otherwise required, because the polymer encounters elevated pressure and temperature sooner and is discharged in a more uniform condition that enhances drying, particularly with the use of the new distributor. This, in turn, permits the enlargement of the exit die openings with resultant reduced exit back pressure required and product discharge velocity. The overall effect is higher throughput capability, reduced product sticking and losses, reduction in "fines," better drying and conveying, and lower temperature requirement for drying polymer to specification.

FIGS. 5 and 6 illustrate graphically the beneficial results of the flight apertures or slots. FIG. 5 indicates in dash line a typical pressure-time profile in a polymer drying press constructed according to previous standard drying practice, for instance, for polybutadiene rubber with all screw flights extending solidly around approximately 95% of the barrel (FIG. 3). The left end of the dash curve reflects a very high back pressure of approximately 850 p.s.i.g. at the exit die plate, as is necessary for drying due to the short time of application of the heat. The pressure drops sharply and becomes minimal at a point in the press barrel about three quarters of the barrel length from the entrance.

In FIG. 6, the dash curve represents the corresponding temperature range from 125° F. at three quarters along the barrel length and sharply increasing to 375° F. at the discharge die plate.

FIGS. 5 and 6 show, in solid lines, the pressure and temperature ranges reflected in the modified press herein described. In FIG. 5, the internal pressure is shown to rise gradually from prior to the midpoint of the curve and the beginning of the modified flights to approximately 500 p.s.i.g., where it remains substantially constant to the discharge point. The solid line curve in FIG. 6 shows a similar gradation from about 150° F. at the entrance end and 350° F. at the die plate. Thus, the polymer is subjected to adequate conditions for acceptance of work input through a much greater portion of the press length than in case of the heretofore standard practice. Further, as stated, the quality of the discharged polymer crumb is much improved.

THE DISTRIBUTOR

Another feature contributing substantially to the improved results is the distributor shown in detail in FIGS. 7 and 8. In previous practice, without the distributor, with die plate perforations uniformly distributed over the entire die plate, polymer flow tended to favor certain of the perforations, channeling to a few and exiting therefrom with greater velocity and explosiveness than from the other holes. The outer holes would emit the most polymer at higher velocity than the inner holes, due to the proximity of the outer holes to the screw threads. The novel distributor consists of a body forming plate 65 having holes 66 for set screws to prevent torque from overtightening the distributor into the threaded end of the drive shaft, between the same and inner face of the die plate 20. A centering threaded stub shaft 68 screws into a threaded recess in the end of the drive shaft. Impeller wipers 69 formed on plate 65 have approximately radially and concavely curved inner, non-cutting edges 70. These wipers have nominal clearance of ½ inch behind the die plate and, rotating with the drive shaft, guide the pressured product more or less uniformly into all of the die plate holes, and prevent solid strands of polymer by interrupting the flow to each hole twice per revolution.

The positioning and shape of the flight slotting or apertures may be modified as desirable to serve the heating requirements of various polymers, as may the distribution of the apertured and standard flight groups. For instance, the apertured flights may be assembled in groups of, say, two or three positioned along the barrel among the standard flights and vice versa. The exclusive use of all modifications as come within the scope of the appended claims is contemplated.

I claim:

1. A screw press for drying dewatered elastomeric polymer amd the like comprising a barrel having a product inlet and a restricted outlet, said barrel having a first section and a second section, said second section terminating in said outlet, said first section having one end connected to said second section and the other end adjacent said product inlet, a powered drive shaft therein, said shaft having a plurality of individual separated helical flights in seriatim order thereon at substantially uniform pitch angles, certain of said flights extending around approximately 95% of the shaft circumference and substantially solidly between the roots and crests of said certain flights and with their crests closely approaching and conforming to the shape of the barrel wall so as to substantially eliminate escape of the product therearound, all of said certain flights having apertures over the remaining 5% portion of each circumference wherein said apertures extend from said root to said crest, said certain flights are located in said first and second section, others of said flights located in said second section, each of said other flights having a plurality of circumferentially spaced apertures that extend from said root to said crest whereby product entering said inlet will be forwardly and radially impelled by said certain flights and said other apertured flights have the effect of substantially reducing the axial advancement of the product while increasing the radial impulsion and internal pressure of the product in advance thereof.

2. A screw press as described in claim 1 in which contiguous ones of said certain and other flights in said second section are arranged in groups with at least one of said certain flights downstream of all said other flights.

3. A screw press as described in claim 1 wherein certain flights and said other flights are disposed alternately along said second section of said barrel.

* * * * *